Figure 6:
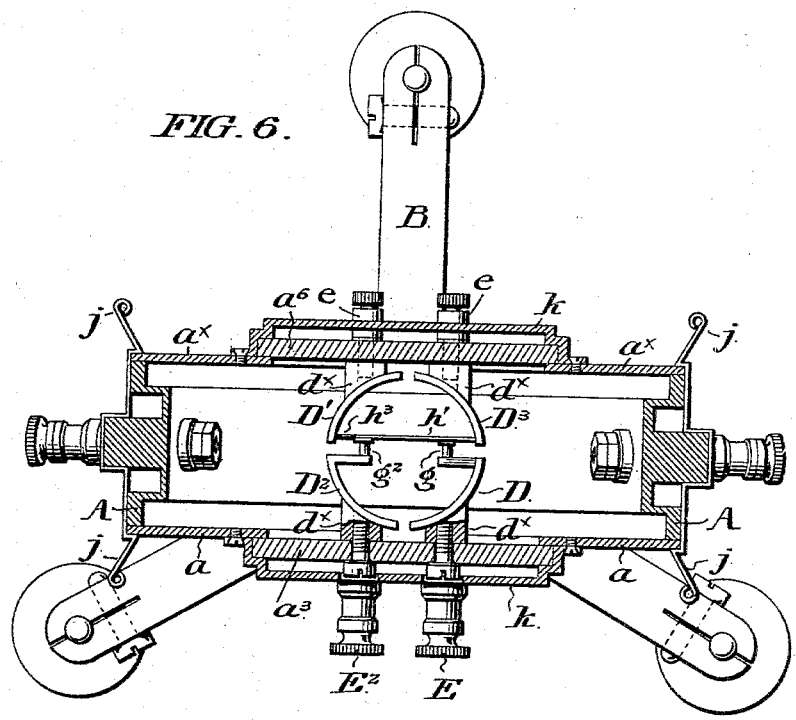

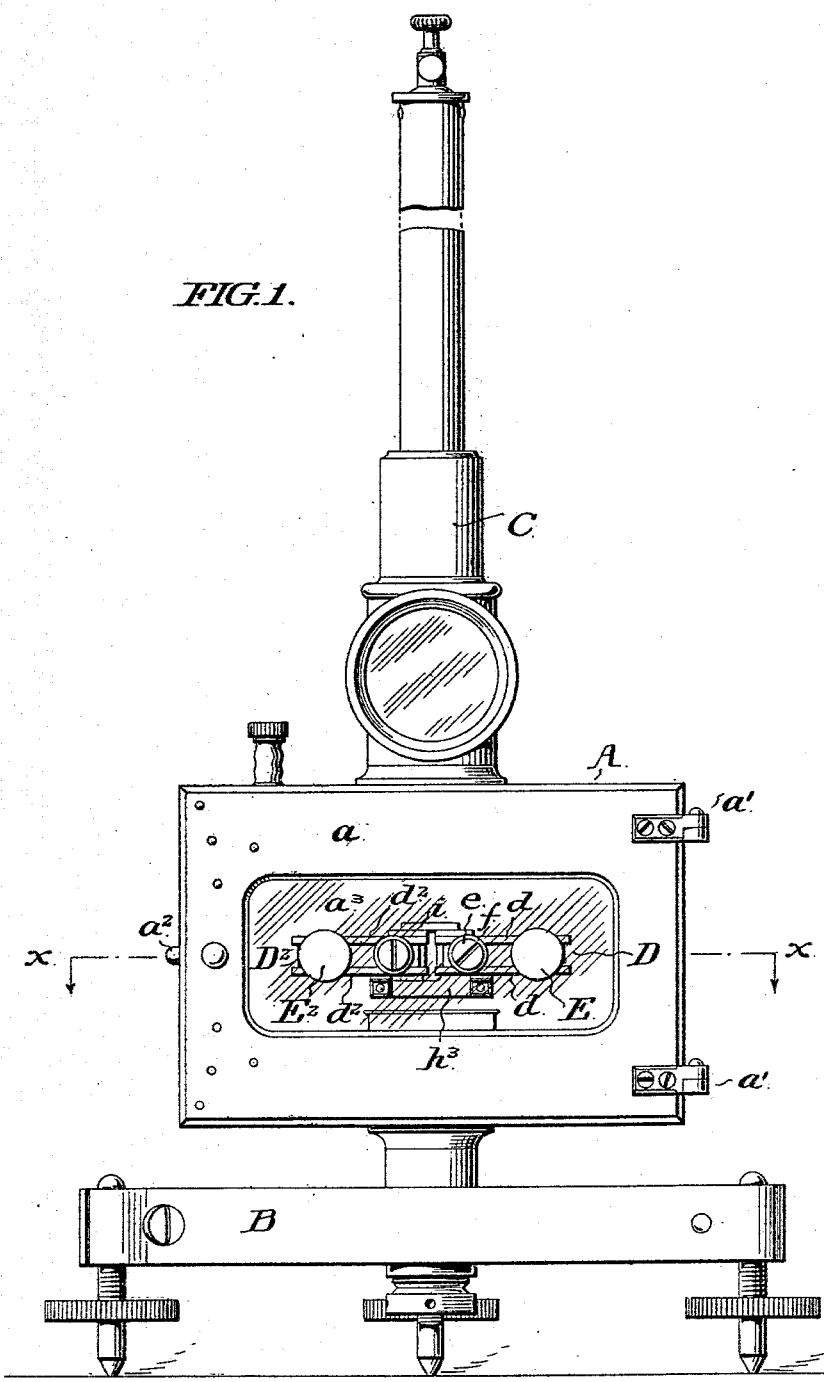

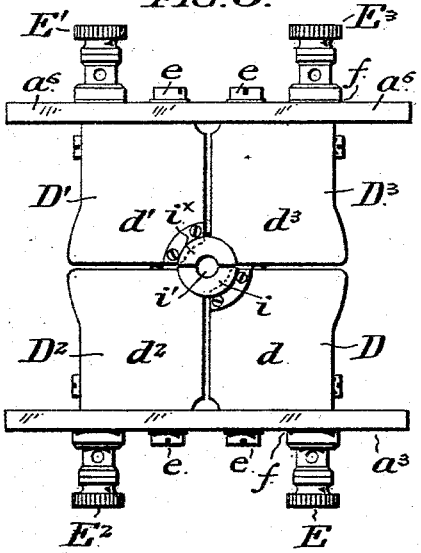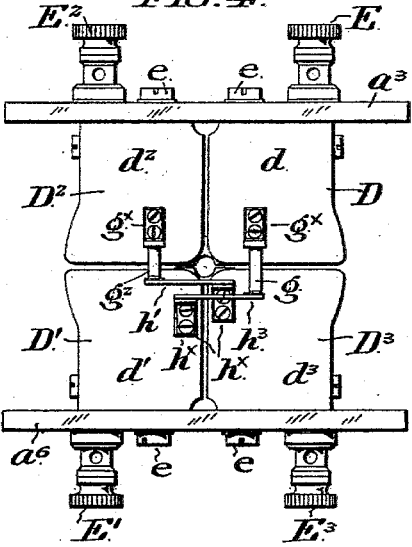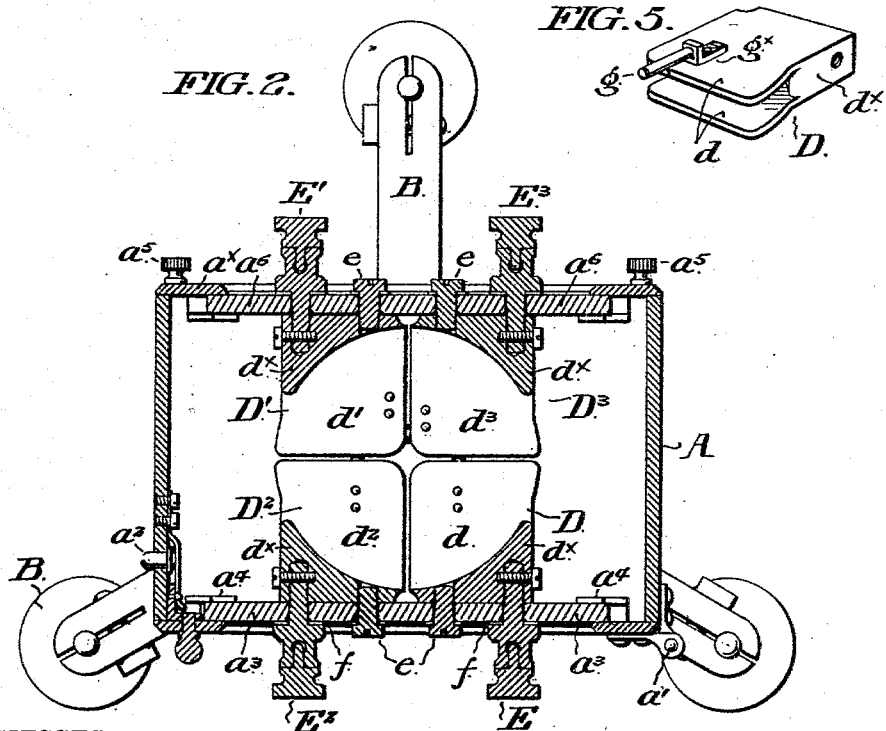

(No Model.)

E. G. WILLYOUNG.
ELECTRICAL MEASURING INSTRUMENT.

No. 514,581. Patented Feb. 13, 1894.

WITNESSES:
A. E. Paige
F. Norman Dixon

Elmer G. Willyoung
INVENTOR
By his Attorneys,
Wm. C. Strawbridge
J. Bonsall Taylor

UNITED STATES PATENT OFFICE.

ELMER G. WILLYOUNG, OF PHILADELPHIA, PENNSYLVANIA, ASSIGNOR TO THE QUEEN & COMPANY, INCORPORATED, OF SAME PLACE.

ELECTRICAL MEASURING-INSTRUMENT.

SPECIFICATION forming part of Letters Patent No. 514,581, dated February 13, 1894.

Application filed October 13, 1893. Serial No. 488,043. (No model.)

*To all whom it may concern:*

Be it known that I, ELMER G. WILLYOUNG, a citizen of the United States, residing in the city and county of Philadelphia, in the State of Pennsylvania, have invented certain new and useful Improvements in Electrical Measuring-Instruments, of which the following is a specification.

My invention relates to quadrant electrometers, which, as is well known, are instruments for measuring the electromotive force of either direct or alternating currents of electricity, by utilizing the attractive force of plates or quadrants on a light needle of aluminium suspended within them. The sectors or quadrants are usually of brass, of such shape that when assembled they form in effect a hollow cylindrical box, either closed or open at top and bottom; all of the quadrants are insulated from one another, and the diagonally opposite quadrants are electrically connected. The needle, maintained at some constant potential, preferably by connection with a Leyden jar, is suspended to swing freely inside the cylindrical box, in axial alignment therewith. The quadrants are connected with a source the difference of potential of which is to be measured, and the deflections of the needle are usually observed through a telescope by means of a spot of light reflected from a mirror attached to the upper part of the needle.

These instruments have been made in many forms, and the box composite of their quadrants has varied in dimensions, and the needle in its form, in correspondence with the form of the box.

In the assembling of the parts of the instrument it is essential that the quadrants should be perfectly concentric and absolutely co-planar. This result has been difficult of attainment, because as these instruments have heretofore been constructed, each quadrant has been supported upon a separate glass tube cemented at one extremity to a suitable cap attached to the quadrant and at the other extremity cemented to a corresponding cap, fixable, by means of a nut or its equivalent, to some exterior part, usually the top or cover plate of the casing, within which the quadrants are inclosed. Apart from the difficulties of the adjustment of the quadrants, this construction was disadvantageous in that it was both awkward and difficult to get at the needle to clean it, or for the repair of the suspending fiber in case of its break-down, or in the event of other accidents. The glass rods, moreover, were frail and detracted from the strength of the instrument. Heretofore, moreover, the diagonally opposite quadrants have been electrically connected by the use of flexible spirals of wire of suitable fineness, attached at their respective ends to the appropriate quadrants by means of small binding screws, which require to be loosened to free the ends of the wires for purposes of cleaning or repairs.

It is the object of my invention to overcome the above mentioned disadvantageous conditions which have been inseparable from these instruments as heretofore constructed, and to so construct a quadrant electrometer that the support of the quadrants may be easily accomplished, and yet be of such character as to insure the requisite concentric and co-planar relationship of the quadrants,—and also to provide means whereby the diagonally opposite quadrants may be instantly and automatically electrically connected or disconnected. These results I accomplish by the means hereinafter particularly described, which, so far as the mounting and maintenance of the quadrants is concerned, consists in securing said quadrants by adjacent (not diagonally) opposite pairs to opposite mutually separable members of a case or casing adapted to contain the quadrant box and the needle,—and which, so far as they relate to the electrical connection or disconnection of diagonally opposite quadrants, reside in the provision of studs or pins upon a given pair of adjacent quadrants, which are adapted, in the mutual approach or recession of the members of the casing which carry said pairs of quadrants to make contact, or to be withdrawn from contact, with flat springs applied to the opposite pair of adjacent quadrants.

In the accompanying drawings, I have represented and hereinafter I describe two forms of quadrant electrometer alike embodying my improvements.

Figure 7:
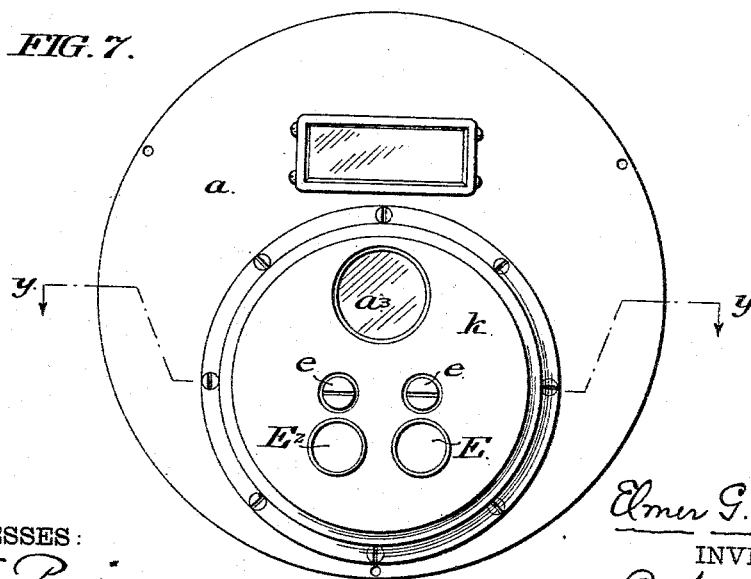

In the drawings, Figure 1 is a front elevational view of a quadrant electrometer, the casing of which possesses the form of a parallelopipedon. Fig. 2 is a central, horizontal, sectional, plan view of the same, in the plane of the dotted line $x-x$ of Fig. 1. Fig. 3 is a top plan view, and Fig. 4 a bottom plan view, of the quadrants and of a portion of the casing. Fig. 5 is a perspective detail of one of the quadrants removed from the casing. Fig. 6 is a horizontal, central, sectional, plan view through an electrometer of the type known as the "Ryan," the casing of which is cylindrical,—section being supposed in the plane of the dotted line $y-y$ of Fig. 7, and Fig. 7 is a front elevational view of the face plate of the electrometer represented in Fig. 6.

Similar letters of reference indicate corresponding parts.

Referring now to the instrument represented in the first five figures of the drawings:—A is the casing or framework of the instrument, possessing, as stated, the form of a parallelopipedon, and rotatably mounted in the usual manner upon the usual tripod stand B. The front face $a$ is made in the form of a swinging door to the casing, it being provided with hinges $a'$, and a spring catch $a^2$ or other appropriate fastening. It is formed with a central opening closed by the application to it from the inside of a plate or panel $a^3$ of glass or quartz,—quartz being preferable by reason of its superior insulating qualities. This plate or panel may be secured as convenience of manufacture may dictate. I prefer to secure it by clips $a^4$ fitted over its corners and screwed or otherwise secured against the back face of the door. The rear face, $a^x$, of the casing corresponds in every particular with the front face, $a$, except that it is not hinged, but is permanently, although removably, secured by means of thumb screws $a^5$. It is provided with a panel $a^6$ of glass or quartz, similar to the panel in the front face of the casing, and similarly secured. The inside and outside faces of the two panels are plane surfaces made exactly parallel with each other.

The top, bottom, and sides of the casing are solid, and the casing itself is provided with the usual vertically erected tube, within which the suspension fiber of the needle is suspended, and which may be of any preferred construction.

Each of the quadrants, which are respectively designated D, D', $D^2$, and $D^3$, and one of which is represented in perspective in Fig. 5, is composed, in the form represented in the first five figures of the drawings, of a couple of webs $d$, $d'$, $d^2$, or $d^3$, as the case may be, parallel with each other and caused to possess a quadrantal form by being each formed with an internally arc-shaped connecting body $d^x$, the form of which will be understood by an inspection of Figs. 2 and 5, and one at least of the outer boundaries of which is a flat and plane surface, right-angular with respect to the planes of the webs, and adapted to be secured flatwise and firmly against the inner face of the panel of quartz to which it is applied,—the connection being most conveniently effected by a screw $e$ passing through the panel and into the substance of the body of the quadrant, and by a binding post E, E', $E^2$, or $E^3$, which not only subserves the function of a binding post for the exterior conductors, but also the function of a securing screw.

It will be apparent that other devices than screws may be employed to secure the quadrants, but screws are most convenient, and, with or without the interposition of washers $f$ of felt or other soft material, serve to effect a permanent and accurate union of the quadrant and the panel.

It will now be understood that the front and rear faces of the casing constitute the relatively separable members thereof, which are provided each with an adjacent pair of quadrants adapted to be, in the construction under discussion, caused to approach or recede from each other by virtue of the hinging of the front face.

One quadrant of each adjacent pair,—in the construction represented the pair applied to the panel of the front face or door of the casing,—is equipped with a horizontally projecting platinized stud or pin $g$ or $g^2$, Fig. 4, preferably applied by means of an angle bar $g^x$ to the under web of the quadrant.

Each quadrant of the opposite pair,—in the construction under discussion the pair applied to the panel of the rear face of the casing,—is equipped with a flat spring $h'$ or $h^3$,—which are so arranged as to relatively cross or overlap each other, in order that each spring may make contact with the stud of the quadrant diagonally opposite to that to which it is connected. These springs are conveniently secured by angle bars $h^x$, affixed respectively to the under webs of their respective quadrants. The adjustment of the studs and springs is such that when the front face of the casing is closed or brought into its final position, the studs slightly force back the springs to insure a perfect contact. Obviously the instant that the door is opened the contact is broken, and the instant that the door is closed the contact is established.

I have not deemed it necessary to show the conductors which establish the appropriate circuit connections between the binding posts and the studs and springs, as they are any such conductors as are usually employed in these instruments and as may be appropriately connected or consolidated with the quadrants.

$i$ $i^x$ are the semi-circular sections of a split insulating collar, one being applied in connection with each adjacent pair of quadrants, in order that when the quadrants are in their normal position the sections may, as shown in Fig. 3, constitute a circular guide or aperture $i'$ for the suspending fiber of the needle, which last named device I have, for clearer illustration, omitted from the drawings.

In the construction represented in Figs. 6 and 7, which disclose a "Ryan" electrometer, the quadrants when applied from a cylinder of considerable depth, open at top and bottom. The casing is cylindrical, its axis being horizontal, and its front and rear faces, or relatively separable members, being both removable circular plates conveniently adapted to be secured to the cylindrical side walls of the casing by spring clips $j$. In this structure the panels of quartz which happen to be circular, are secured by cap plates $k$, and the quadrants which, like the quadrants of the instrument already described, possess bodies $d^x$, and are adapted to be secured by screws $e$ and binding posts E $E^2$ as shown. Each quadrant of an adjacent pair is provided with a platinized stud or pin $g$, $g^2$, or with a flat spring $h'$ $h^3$ in essentially the manner of the quadrants of the other form of instrument referred to, and when the front and rear faces of the casing are applied and secured in place upon the body of the instrument, the pins and springs of the quadrant make contact, while the quadrants themselves are applied and secured in essentially the same manner, as in the instrument first described.

Having thus described my invention, it is proper to add that minor details which involve simply the mechanical construction of the instrument may be altered or modified at will without departure from the spirit of my invention.

Having thus described my invention, I claim—

1. In a quadrant electrometer,—a casing within which the quadrants are adapted to be contained, two of the opposite sides or faces of which casing are relatively separable, and each of which is provided with a pair of adjacent quadrants adapted to be assembled in appropriate relationship when the separable members of the casing are closed,—substantially as described.

2. In a quadrant electrometer,—a casing two of the opposite sides or faces of which contain panels of quartz or glass, and are respectively provided with a pair of adjacent quadrants, adapted, when the casing is closed, to be assembled in their appropriate relationship,—substantially as described.

3. In a quadrant electrometer,—a casing two of the opposite sides or faces of which contain panels of quartz or glass, and are respectively provided with a pair of adjacent quadrants, adapted, when the casing is closed, to be assembled in their appropriate relationship,—and which is provided with binding screws passing through the panels from the outside and entering the substance of the quadrants to secure the latter in appropriate position against the inner faces of the panels,—substantially as described.

4. In a quadrant electrometer,—a casing within which the quadrants are adapted to be contained, two of the opposite sides or faces of which casing are relatively separable, and each of which sides is provided with a pair of adjacent quadrants, the quadrants of one of which pairs are provided with a contact stud or pin, and the quadrants of the other of which pairs are each provided with a contact spring so disposed as to make contact with the stud of the diagonally opposite quadrant, when, in the closing of the casing, the pairs of adjacent quadrants are assembled in their ultimate relationship,—substantially as described.

In testimony that I claim the foregoing as my invention I have hereunto signed my name this 20th day of September, A. D. 1893.

ELMER G. WILLYOUNG.

In presence of—
J. BONSALL TAYLOR,
F. NORMAN DIXON.

It is hereby certified that in Letters Patent No. 514,581, granted February 13, 1894, upon the application of Elmer G. Willyoung, of Philadelphia, Pennsylvania, for an improvement in "Electrical Measuring-Instruments," an error appears in the printed specification requiring the following correction, viz: On page 3, line 5, the word "from" should read *form*; and that the said Letters Patent should be read with this correction therein that the same may conform to the record of the case in the Patent Office.

Signed, countersigned, and sealed this 13th day of March, A. D. 1894.

[SEAL.]

JNO. M. REYNOLDS,
*Assistant Secretary of the Interior.*

Countersigned:
JOHN S. SEYMOUR,
*Commissioner of Patents.*